United States Patent
Rk et al.

(10) Patent No.: US 11,005,748 B2
(45) Date of Patent: May 11, 2021

(54) OPTIMIZATIONS FOR CLOUD STORAGE RELATED DATA FLOW

(71) Applicant: Nokia Solutions and Networks Oy, Espoo (FI)

(72) Inventors: Sandeep Rk, Bangalore (IN); Elangovan Manickam, Bangalore (IN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/497,809

(22) PCT Filed: Mar. 31, 2017

(86) PCT No.: PCT/EP2017/057644
§ 371 (c)(1),
(2) Date: Sep. 26, 2019

(87) PCT Pub. No.: WO2018/177530
PCT Pub. Date: Oct. 4, 2018

(65) Prior Publication Data
US 2020/0106695 A1    Apr. 2, 2020

(51) Int. Cl.
*H04L 12/721* (2013.01)
*H04L 12/707* (2013.01)
*H04L 12/717* (2013.01)
*H04L 29/08* (2006.01)
*H04W 84/12* (2009.01)

(52) U.S. Cl.
CPC .............. *H04L 45/12* (2013.01); *H04L 45/24* (2013.01); *H04L 45/42* (2013.01); *H04L 67/1097* (2013.01); *H04L 67/12* (2013.01); *H04W 84/12* (2013.01)

(58) Field of Classification Search
CPC ........................... H04L 67/1097; H04L 67/12
See application file for complete search history.

(56) References Cited

U.S. PATENT DOCUMENTS

| | | | |
|---|---|---|---|
| 2007/0022092 A1* | 1/2007 | Nishizawa | ........ G06F 16/24568 |
| 2011/0320520 A1 | 12/2011 | Jain | |
| 2012/0015644 A1* | 1/2012 | Danford | .................. H04L 67/04 455/419 |
| 2012/0072481 A1 | 3/2012 | Nandlall et al. | |
| 2012/0124414 A1* | 5/2012 | Dallas | ................. H04L 67/1097 714/6.2 |
| 2013/0097276 A1 | 4/2013 | Sridhar | |
| 2013/0219069 A1* | 8/2013 | Yellapragada | ........ G06F 3/0664 709/226 |
| 2014/0019583 A1* | 1/2014 | Sethuraman | .......... H04L 65/601 709/217 |

(Continued)

OTHER PUBLICATIONS

International Search Report and Written Opinion received for corresponding Patent Cooperation Treaty Application No. PCT/EP2017/057644, dated Nov. 28, 2017, 8 pages.

*Primary Examiner* — Gary Mui
(74) *Attorney, Agent, or Firm* — Nokia Technologies Oy

(57) ABSTRACT

There are provided measures for optimizations for cloud storage related data flow. Such measures exemplarily comprise receiving, from a component of said terminal, data related to an application, identifying, in said data, storage data intended for cloud storage, and selecting, for said storage data, a transmission path of a plurality of transmission paths to said cloud storage bypassing an application server hosting said application.

20 Claims, 11 Drawing Sheets

(56) References Cited

U.S. PATENT DOCUMENTS

| | | | |
|---|---|---|---|
| 2014/0213256 A1* | 7/2014 | Meylan | H04W 48/18 |
| | | | 455/436 |
| 2015/0119101 A1* | 4/2015 | Cui | H04W 48/18 |
| | | | 455/525 |
| 2015/0230124 A1* | 8/2015 | Damola | H04W 28/02 |
| | | | 370/235 |
| 2015/0358893 A1* | 12/2015 | Laselva | H04W 48/14 |
| | | | 370/329 |
| 2016/0140162 A1* | 5/2016 | Robbin | G06F 16/182 |
| | | | 707/695 |
| 2017/0192979 A1* | 7/2017 | Yang | G06F 16/176 |
| 2017/0331898 A1* | 11/2017 | Lee | H04L 67/02 |
| 2017/0359131 A1* | 12/2017 | Mashimo | H04B 17/309 |
| 2018/0084052 A1* | 3/2018 | Trachy | G06F 11/1461 |
| 2018/0373736 A1* | 12/2018 | Guo | H04L 67/1097 |
| 2019/0149599 A1* | 5/2019 | Bartfai-Walcott | H04L 67/125 |
| | | | 709/226 |
| 2019/0158408 A1* | 5/2019 | Li | H04L 67/104 |

\* cited by examiner

OPTIMIZATIONS FOR CLOUD STORAGE RELATED DATA FLOW

FIELD

The present invention relates to optimizations for cloud storage related data flow. More specifically, the present invention exemplarily relates to measures (including methods, apparatuses and computer program products) for realizing optimizations for cloud storage related data flow.

BACKGROUND

The present specification generally relates to optimization and synchronization of data traffic to a backend cloud storage like shared data layer (SDL) for example in the Internet-of-Things (IoT) and 3rd Generation Partnership Project (3GPP) 5th Generation (5G) networks to cater to explosive data traffic growth and reduce latency to virtual zero.

Currently, data generated by IoT devices (machine type communication (MTC) and device-to-device (D2D)) in 4th Generation (4G) and 5G networks take data flow paths which terminate at the IoT application server/Proximity Services (ProSe) application server, which resides behind the application enablement platform AEP. The applications (at the respective application server) then decide to store the data within a cloud storage like SDL for further analysis and retrieval at a future time.

However this is non optimal and introduce unnecessary delays and involvement of unnecessary elements. Also, this known approach requires the active participation of the application servers themselves in storage of the network elements.

Hence, the problem arises that storing data in cloud storages underlies noticeable delays. This is the more relevant and the more noticeable the more devices are trying to access the cloud storages via the application servers. In this regard, it is noted that it is in the nature of the things of the IoT concept that there will be plenty of respective devices, such that a significant run on the cloud storages can be expected.

Hence, there is a need to provide for optimizations for cloud storage related data flow.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method at a terminal, comprising receiving, from a component of said terminal, data related to an application, identifying, in said data, storage data intended for cloud storage, and selecting, for said storage data, a transmission path of a plurality of transmission paths to said cloud storage bypassing an application server hosting said application.

According to an exemplary aspect of the present invention, there is provided a method at a mobile edge computing component of a mobile communication network, comprising receiving storage data related to an application, the storage data being originated from a terminal and intended for cloud storage, and forwarding said storage data to said cloud storage bypassing an application server hosting said application.

According to an exemplary aspect of the present invention, there is provided an apparatus at a terminal, the apparatus comprising at least one processor, at least one memory including computer program code, and at least one interface configured for communication with at least another apparatus, the at least one processor, with the at least one memory and the computer program code, being configured to cause the apparatus to perform receiving, from a component of said terminal, data related to an application, identifying, in said data, storage data intended for cloud storage, and selecting, for said storage data, a transmission path of a plurality of transmission paths to said cloud storage bypassing an application server hosting said application.

According to an exemplary aspect of the present invention, there is provided an apparatus for at a mobile edge computing component of a mobile communication network, the apparatus comprising at least one processor, at least one memory including computer program code, and at least one interface configured for communication with at least another apparatus, the at least one processor, with the at least one memory and the computer program code, being configured to cause the apparatus to perform receiving storage data related to an application, the storage data being originated from a terminal and intended for cloud storage, and forwarding said storage data to said cloud storage bypassing an application server hosting said application.

According to an exemplary aspect of the present invention, there is provided an apparatus at a terminal, comprising receiving circuitry configured to receive, from a component of said terminal, data related to an application, identifying circuitry configured to identify, in said data, storage data intended for cloud storage, and selecting circuitry configured to select, for said storage data, a transmission path of a plurality of transmission paths to said cloud storage bypassing an application server hosting said application.

According to an exemplary aspect of the present invention, there is provided an apparatus at a mobile edge computing component of a mobile communication network, comprising receiving circuitry configured to receive storage data related to an application, the storage data being originated from a terminal and intended for cloud storage, and forwarding circuitry configured to forward said storage data to said cloud storage bypassing an application server hosting said application.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient determination between data actually intended for cloud storage and data (e.g. control data) actually intended for the application (server) itself, and to optimize the data flow of the data actually intended for cloud storage for significantly reducing latency, to thereby solve at least part of the problems and drawbacks identified in relation to the prior art.

By way of exemplary embodiments of the present invention, there is provided optimizations for cloud storage related data flow. More specifically, by way of exemplary embodiments of the present invention, there are provided measures and mechanisms for realizing optimizations for cloud storage related data flow.

Thus, improvement is achieved by methods, apparatuses and computer program products enabling/realizing optimizations for cloud storage related data flow.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) optimizations for cloud storage related data flow.

As discussed above, currently there is no differentiation in the data flow intended for the application and the storage and both tend to take the same approach leading to unnecessary delays.

Figure 8:
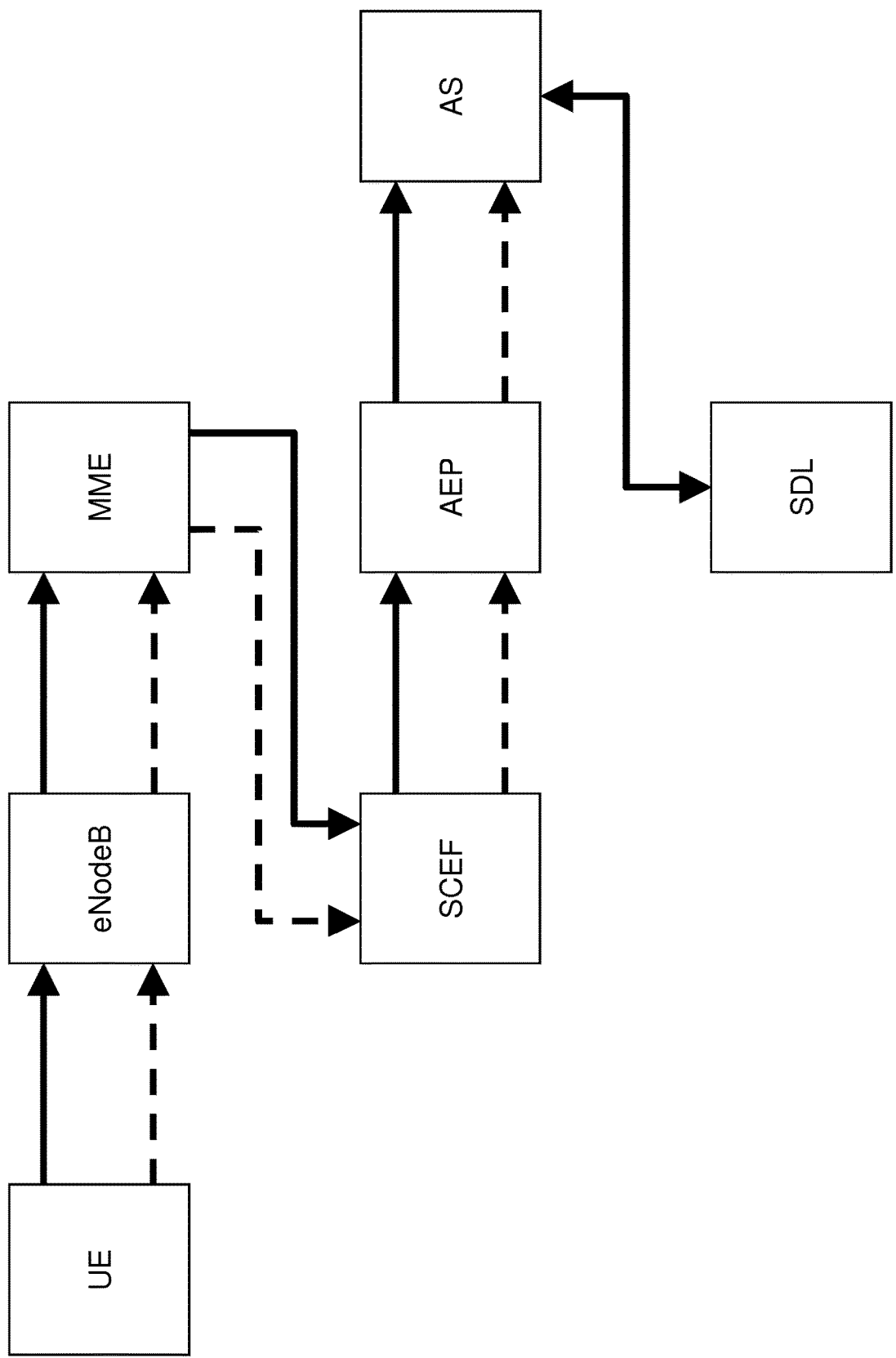
FIG. 8 shows a schematic diagram of an example of a system environment with known signaling variants.

FIG. 8 shows a schematic diagram of an example of a system environment with known signaling variants.

FIG. 8 illustrates the current flow of data in the above-mentioned scenario.

In such scenario according to FIG. 8, the user equipment (UE) which may e.g. be an IoT device having data for the cloud storage (also cloud backend storage, data storage function, shared data layer (SDL)) may be connected to the application server (AS) via an evolved Node B (eNodeB, eNB), a mobility management entity (MME), a service capability exposure function (SCEF), and an application enablement platform (AEP).

Currently, both the intended control data (dashed arrows, control data towards AS) and (payload) data (solid arrows, data towards SDL) flows in the same path towards the SDL and the application server. The data is transmitted via the eNodeB towards the core elements of the network. The AS residing behind the AEP receives the data via the SCEF and then stores the data into the cloud for future use or analysis.

In this procedure, there is unnecessary involvement of lot network elements and the AS itself for the part of the data which is not control information but intended only to be stored and processed within the SDL.

Particularly in the IoT scenario, when there are billions of devices sending the data to cloud (like eHealth, smart device, etc.), the mentioned transaction burdens a lot of intermediate network nodes and network functions. Similarly, the same burden is generated when data is pushed from the SDL towards the UE(s).

According to exemplary embodiments of the present invention, the control information from the data intended for the cloud storage (also cloud backend storage, data storage function, shared data layer) is decoupled. This separation allows for the data intended for cloud storage to take more optimized and variant paths towards the storage itself.

This is achieved by introduction of "Data Agents" which may be logical extensions of the cloud storage, i.e. SDL, itself. That is, data agents may be enhanced extension of the SDL which provides the SDL view closer to the device (i.e. lot/ProSe device) itself.

According to exemplary embodiments of the present invention, SDL may introduce layers of the storage at various points like the (IoT/ProSe) device itself and in Edge Agents, to ensure that the data is transmitted in a secure and optimized way to the SDL cloud storage.

The major advantage of such approach according to the present invention is that the SDL or cloud storage can be directly available to the device (i.e. UE) via application programming interfaces (API) which may be standardized.

Figure 7:
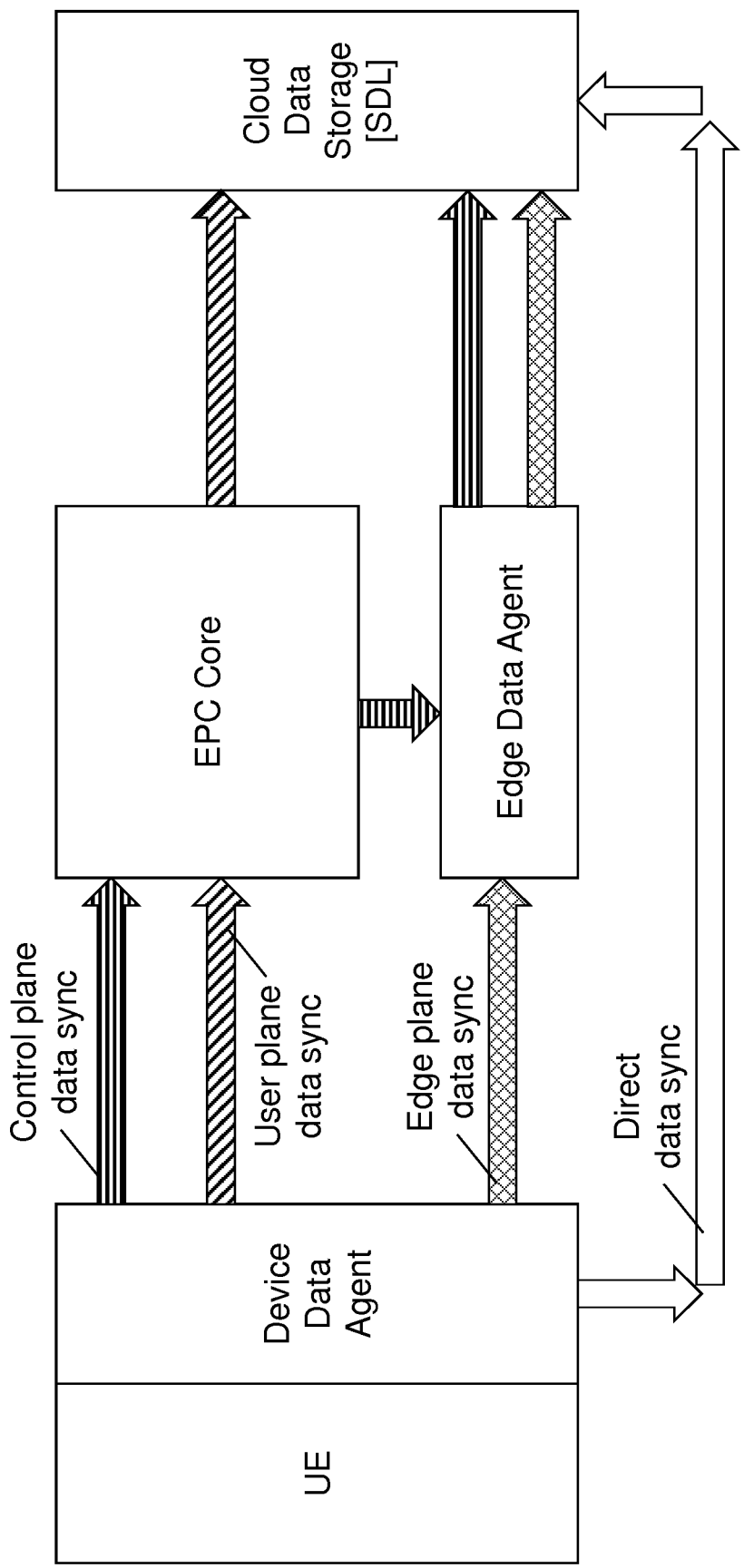
FIG. 7 shows a schematic diagram of an example of a system environment with signaling variants according to exemplary embodiments of the present invention.

A basic architecture and data transmission possibilities of this approach according to exemplary embodiments of the present invention is illustrated in FIG. 7.

Namely, FIG. 7 shows a schematic diagram of an example of a system environment with signaling variants according to exemplary embodiments of the present invention. FIG. 7 particularly shows the introduction of new Data Agents according to exemplary embodiments of the present invention.

In FIG. 7, a general arrangement of an exemplary UE, an evolved packet core (EPC) which embodies the architecture of the core network of e.g. a Long Term Evolution (LTE) network and allows operation and coordination of several radio networks and thus guarantees mobility, handover and roaming between participants, and the cloud data storage (SDL) is shown.

Below, the above-mentioned data agents according to exemplary embodiments of the present invention are described in relation to the arrangement shown in FIG. 7.

Here, the Device Data Agent is an enhanced extension of the SDL itself which resides on the device/UE itself and which works with or without local storage. All data that needs to be stored or transmitted by the UE/device is handed over to this agent that ensures that the most optimized path for the data to be stored in the cloud storage is selected. In a mode with local storage the device data agent can also act as a local agent of SDL for reducing latency in particular in time critical services Further, the Edge Data Agent is an enhanced extension of the SDL which resides on edge elements like e.g. (components of) mobile edge computing (MEC) and which acts as an aggregator towards the cloud storage. The edge data agent also acts as a closer view of the SDL itself so that the latencies involved can be reduced in particular in time critical services.

In this scenario, according to exemplary embodiments of the present invention, the data may flow between the SDL and the Data agents, conventionally from the device (i.e. UE) to SDL, and from SDL to pre-fetch data closer to the device (i.e. UE), namely, either directly onto the device with the Device Data Agent or to the edge elements (e.g. MEC) via the Edge Data Agent.

In FIG. 7, four ways for data flow between the device and SDL are shown.

Namely, on the one hand, a User Plane Data Sync is illustrated (arrows hachured diagonally from top left to bottom right). According to this approach, the data transmission utilizes a current user plane method for synchronizing the data with the SDL, i.e., via the EPC towards the SDL.

Further, a Direct Data Sync is illustrated (arrows not hachured). According to this approach, the device (i.e. UE) transfers the data via the device data agent directly to the SDL e.g. using an independent interface like WLAN, Bluetooth, and ZigBee, etc., thereby avoiding/bypassing the complete EPC. This enables a more heterogeneous set of types of devices including e.g. on-cellular WLAN enabled devices to interwork with e.g. vendor storage and IoT/ProSe applications.

Further, a Control Plane Data Sync is illustrated (arrows hachured horizontally). According to this approach, enhancements for utilization of control plane for transmission of data intended for IoT applications may be used. In particular, while according to this approach the data is transferred via the device data agent towards the EPC, the data is redirected to the edge data agent and then transferred directly to the SDL. Particularly, according to exemplary embodiments of the present invention, the data may be routed directly from the MME/serving GPRS support node (SGSN; GPRS: General Packet Radio Service) as examples for edge elements to the SDL.

Finally, an Edge Plane Data Sync is illustrated (arrows hachured checkered). According to this approach, the data is transferred via the device data agent and the edge data agent directly to the SDL, thereby avoiding/bypassing the complete EPC. In particular, this approach allows for the utilization of the edge data agents to transmit and aggregate the data intended towards SDL.

In the following, exemplary embodiments of the present invention are described in more general terms.

Figure 1:
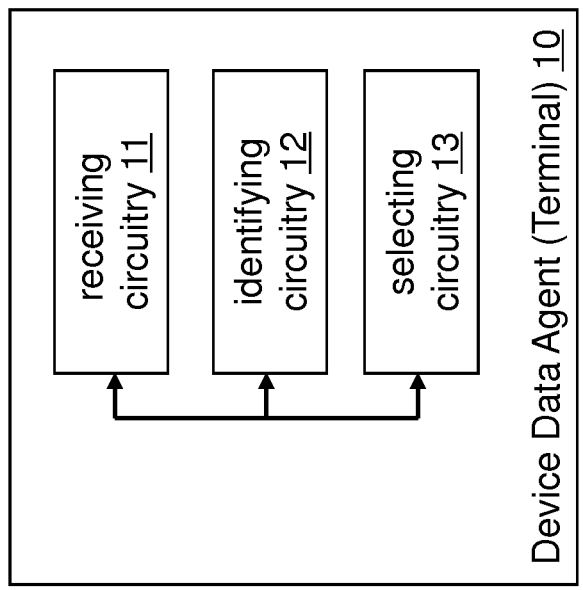
FIG. 1 is a block diagram illustrating an apparatus according to exemplary embodiments of the present invention.
Figure 5:
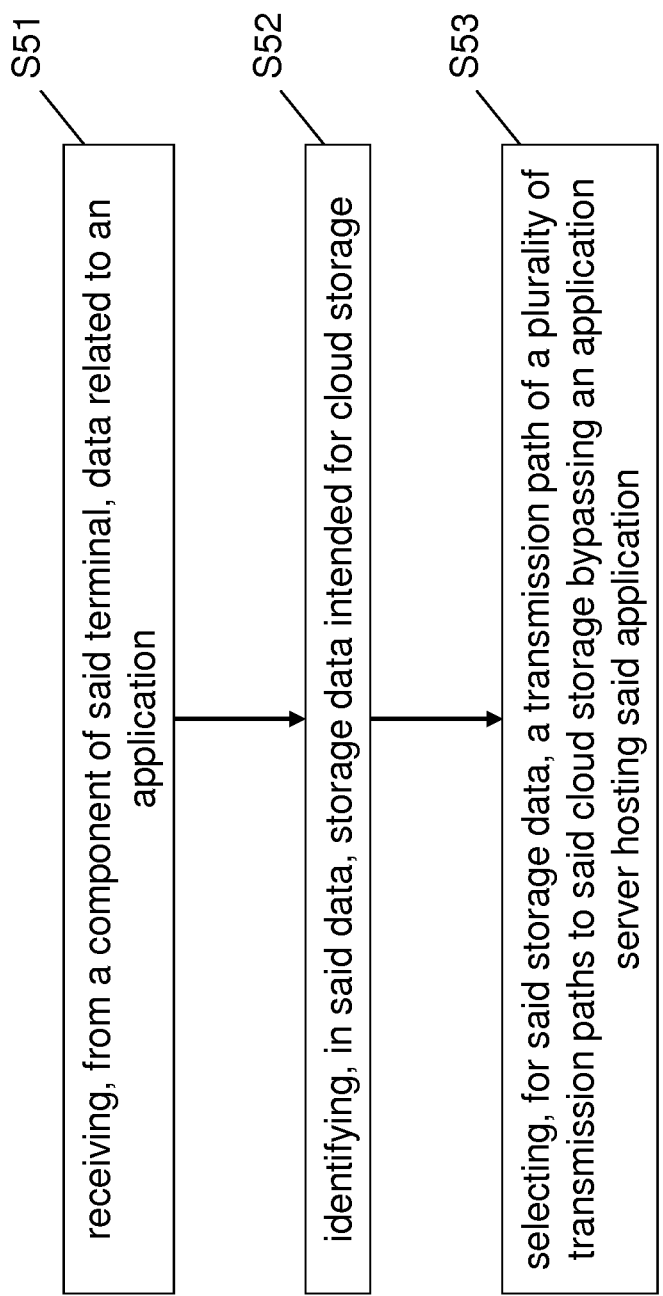
FIG. 5 is a schematic diagram of a procedure according to exemplary embodiments of the present invention.

FIG. 1 is a block diagram illustrating an apparatus according to exemplary embodiments of the present invention. The apparatus may be a component of a terminal such as a UE embodying a device data agent, comprising receiving circuitry 11, identifying circuitry 12, and selecting circuitry 13. The receiving circuitry 11 receives, from a component of said terminal, data related to an application. The identifying circuitry 12 identifies, in said data, storage data intended for cloud storage. The selecting circuitry 13 selects, for said storage data, a transmission path of a plurality of transmission paths to said cloud storage bypassing an application server hosting said application. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51), from a component of said terminal, data related to an application, an operation of identifying (S52), in said data, storage data intended for cloud storage, and an operation of selecting (S53), for said storage data, a transmission path of a plurality of transmission paths to said cloud storage bypassing an application server hosting said application.

Figure 2:
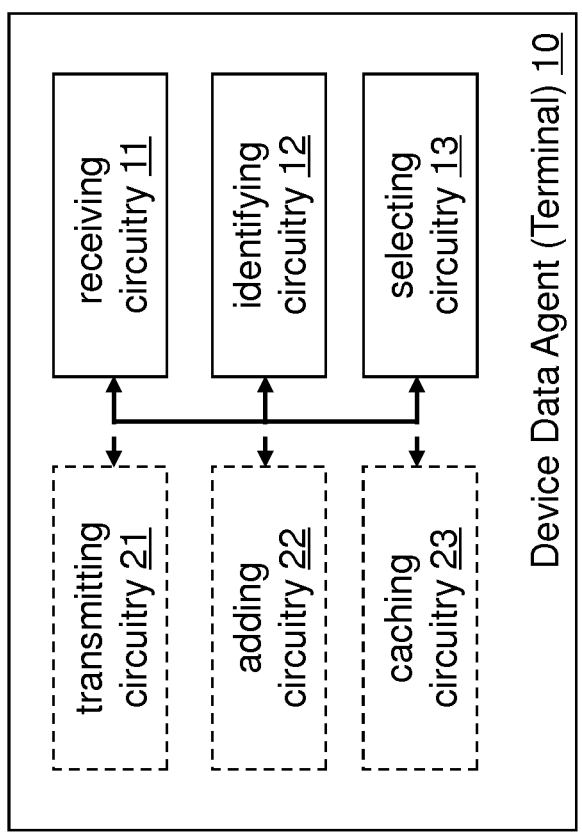
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a transmitting circuitry 21, an adding circuitry 22, and/or a caching circuitry 23.

In an embodiment at least some of the functionalities of the apparatus shown in FIG. 1 may be shared between two physically separate devices forming one operational entity. Therefore, the apparatus may be seen to depict the operational entity comprising one or more physically separate devices for executing at least some of the described processes.

According to a variation of the procedure shown in FIG. 5, exemplary additional operations are given, which are inherently independent from each other as such.

According to such variation, an exemplary method according to exemplary embodiments of the present invention may comprise an operation of transmitting, based on said selecting, said storage data to a mobile edge computing component of a mobile communication network to which said terminal is connected to, for forwarding said storage data to said cloud storage.

According to a variation of the procedure shown in FIG. 5, exemplary additional operations are given, which are inherently independent from each other as such. According to such variation, an exemplary method according to exemplary embodiments of the present invention may comprise an operation of transmitting, based on said selecting, said storage data to a core network of a mobile communication network to which said terminal is connected to, for forwarding said storage data via a mobile edge computing component of said of said mobile communication network to said cloud storage.

According to further exemplary embodiments of the present invention, said transmitting is effected utilizing a control plane of said mobile communication network.

According to a variation of the procedure shown in FIG. 5, exemplary additional operations are given, which are inherently independent from each other as such.

According to such variation, an exemplary method according to exemplary embodiments of the present invention may comprise an operation of adding, to said storage data, control information for said mobile edge computing component including at least one of a life time scope of said storage data and an aggregation capability of said storage data.

According to a variation of the procedure shown in FIG. 5, exemplary additional operations are given, which are inherently independent from each other as such. According to such variation, an exemplary method according to exemplary embodiments of the present invention may comprise an operation of transmitting, based on said selecting, said storage data to said cloud storage, bypassing a mobile communication network to which said terminal is connected to.

According to further exemplary embodiments of the present invention, said transmission path uses at least one of a wireless local area network interface, a Bluetooth interface, and a ZigBee interface.

According to a variation of the procedure shown in FIG. 5, exemplary additional operations are given, which are inherently independent from each other as such.

According to such variation, an exemplary method according to exemplary embodiments of the present invention may comprise an operation of receiving stored data originating from said cloud storage via any of said plurality of transmission paths.

According to a variation of the procedure shown in FIG. 5, exemplary additional operations are given, which are inherently independent from each other as such. According to such variation, an exemplary method according to exemplary embodiments of the present invention may comprise an operation of caching said received stored data.

According to further exemplary embodiments of the present invention, said terminal is an internet of things device.

Figure 3:
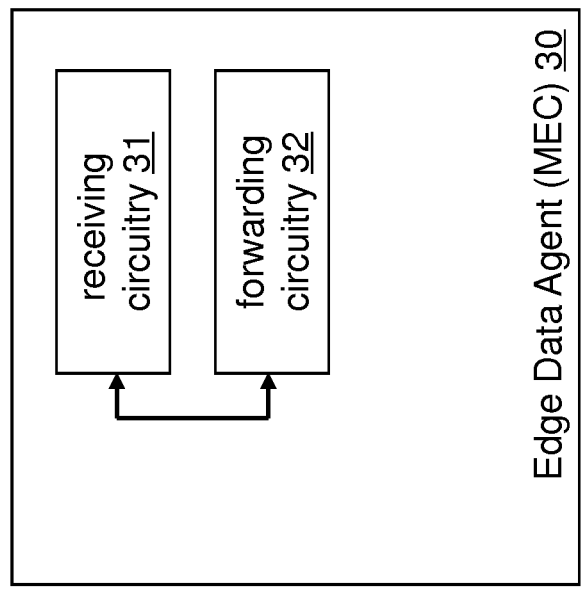
FIG. 3 is a block diagram illustrating an apparatus according to exemplary embodiments of the present invention.

FIG. 3 is a block diagram illustrating an apparatus according to exemplary embodiments of the present invention. The apparatus may be a component of a mobile edge computing component such as an MEC embodying an edge data agent, comprising receiving circuitry 31 and forwarding circuitry 32.

Figure 6:
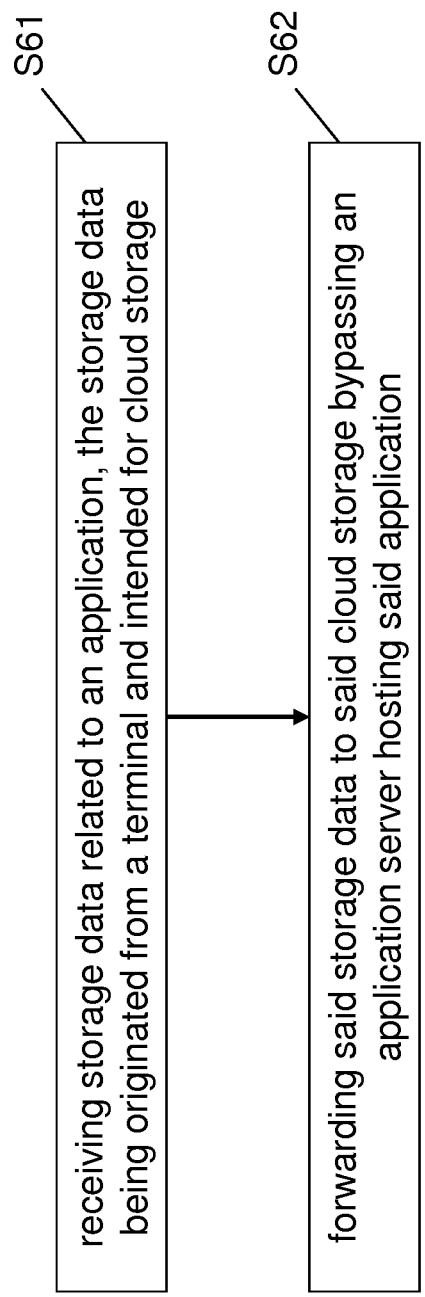
FIG. 6 is a schematic diagram of a procedure according to exemplary embodiments of the present invention.

The receiving circuitry 31 receives storage data related to an application, the storage data being originated from a terminal and intended for cloud storage. The forwarding circuitry 32 forwards said storage data to said cloud storage bypassing an application server hosting said application. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of receiving (S61) storage data related to an application, the storage data being originated from a terminal and intended for cloud storage, and an operation of forwarding (S62) said storage data to said cloud storage bypassing an application server hosting said application.

Figure 4:
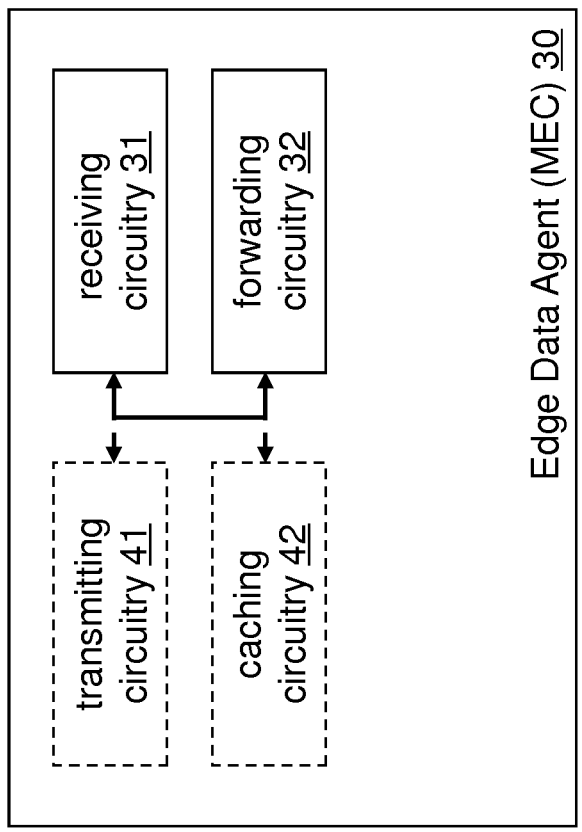
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a receiving circuitry 41 and/or a forwarding circuitry 42.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to further exemplary embodiments of the present invention, said storage data is received (S61) from said terminal.

According to still further exemplary embodiments of the present invention, said storage data is received (S61) from a core network of a mobile communication network to which said terminal is connected to, utilizing a control plane of said mobile communication network.

According to still further exemplary embodiments of the present invention, control information for said mobile edge computing component including at least one of a life time scope of said storage data and an aggregation capability of said storage data is added to said storage data.

According to a variation of the procedure shown in FIG. 6, exemplary additional operations are given, which are inherently independent from each other as such. According to such variation, an exemplary method according to exemplary embodiments of the present invention may comprise an operation of receiving stored data originating from said cloud storage, and an operation of transmitting said stored data towards said terminal.

According to a variation of the procedure shown in FIG. 6, exemplary additional operations are given, which are inherently independent from each other as such. According to such variation, an exemplary method according to exemplary embodiments of the present invention may comprise an operation of caching said received stored data.

According to still further exemplary embodiments of the present invention, said terminal is an internet of things device.

Figure 9:
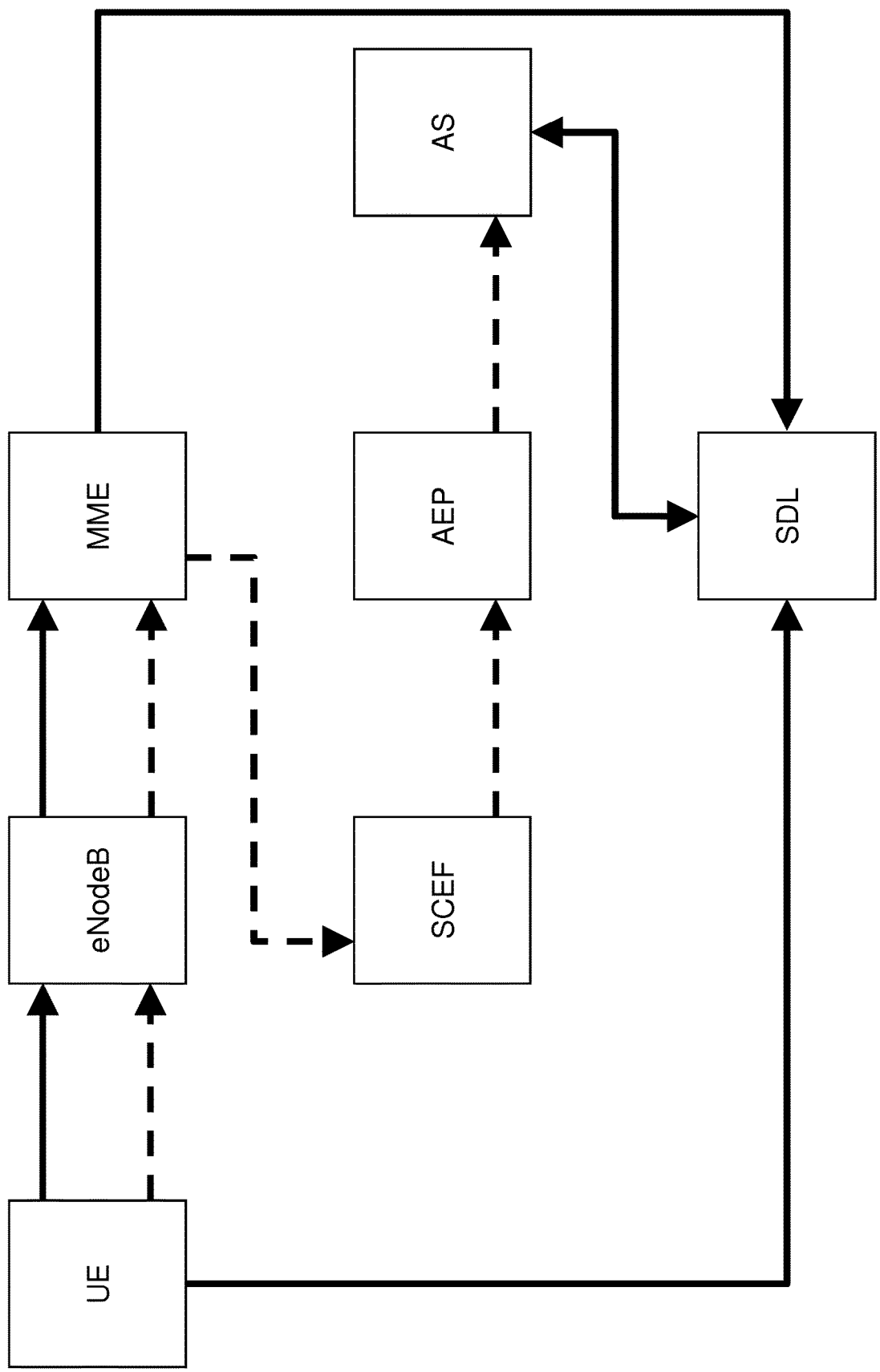
FIG. 9 shows a schematic diagram of an example of a system environment with signaling variants according to exemplary embodiments of the present invention.
Figure 10:
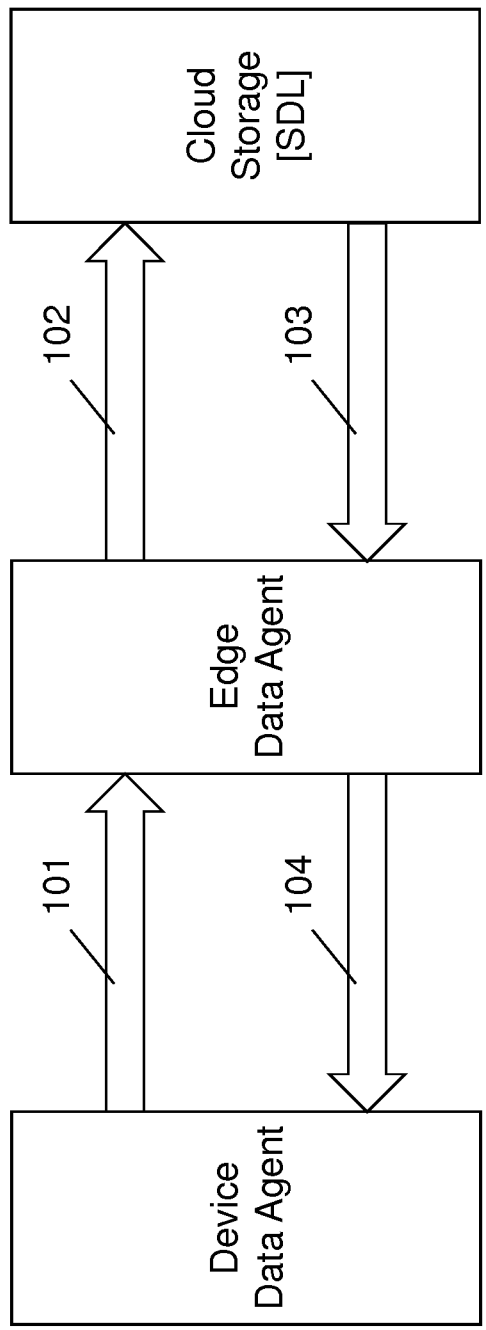
FIG. 10 shows a further schematic diagram of an example of a system environment with signaling variants according to exemplary embodiments of the present invention.

Exemplary embodiments of the present invention are described in more detail in relation to FIGS. 9 and 10, both showing schematic diagrams of an examples of a system environment with signaling variants according to exemplary embodiments of the present invention.

In particular, while FIG. 9 illustrates data flows (solid arrows, data towards SDL) and control information flows (dashed arrows, control data towards AS) in contrast to the respective flows discussed in relation to FIG. 8, FIG. 10 depicts working of the above introduced data agents.

In contrast to FIG. 8 and in line with exemplary embodiments of the present invention as shown in FIG. 9, when there are billions of devices (e.g. UEs, IoT devices) planning to send data to the cloud storage (like eHealth, smart devices, etc.), the respective device can push the data into the edge SDL, so that the above mentioned transaction (via the core network elements) can be avoided for billions of devices and the data of these billions of devices. Similarly, the same mechanism can be used to push the data to the devices from SDL, where the data was moved to SDL which is located in a central/any other location.

In particular, FIG. 8 shows the alternative paths the separated data flow can take to optimize the operations according to exemplary embodiments of the present invention.

One option is for the data flow intended for SDL to take a direct path towards the SDL itself, as already mentioned above. In addition, a second path is for the MME to separate out the SDL intended traffic and directly transfer this data to the SDL to enable direct storage to the SDL.

Both options remove the data flow in unnecessary hops, i.e., the SCEF, AEP and AS itself. Subsequently, the AS can retrieve the data from the SDL directly as required.

As mentioned above, according to exemplary embodiments of the present invention, this behavior facilitated by usage of data agents at the device and edge elements. The data agents may be enhanced extensions of the SDL, which provide the SDL view closer to device itself.

According to further exemplary embodiments or the present invention, in case the device cannot have a data agent as explained above, then the next hop may have the data agent to understand and push the data (e.g. via the edge data agent) to the SDL.

According to exemplary embodiments of the present invention, the various data agents (device and edge) act as abstraction points to the SDL (cloud storage) to enhance the transmission experience and latency. This view is also closely augmented by the network optimizations as described above.

In sum, as is derivable from FIG. 10, according to exemplary embodiments of the present invention, the device agent may choose the most appropriate mode for data transfer and may define a life time scope and aggregation capability of the data (101). The edge agent may aggregate and/or forward the data based on parameters specified by the device agent (102). The cloud storage may push relevant data closer to the device e.g. to enable time critical services (103). The edge agent or cloud storage may choose to pre-fetch data onto the device itself, if storage exists and is permitted e.g. to enable time critical services (104).

Hence, according to exemplary embodiments of the present invention, virtual zero latency may be provided. The present invention may be implemented by utilization of the data agent configuration at the device or the next hop.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification.

The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 11:
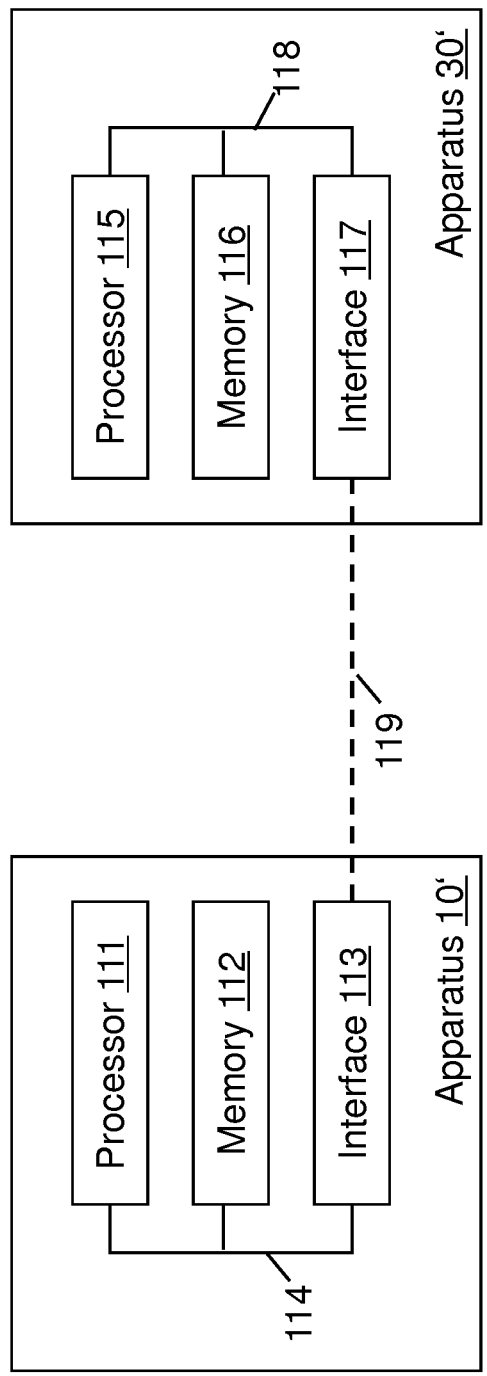
FIG. 11 is a block diagram alternatively illustrating apparatuses according to exemplary embodiments of the present invention.

In FIG. 11, an alternative illustration of apparatuses according to exemplary embodiments of the present invention is depicted. As indicated in FIG. 11, according to exemplary embodiments of the present invention, the apparatus 10' (corresponding to the device data agent (terminal) 10) comprises a processor 111, a memory 112 and an interface 113, which are connected by a bus 114 or the like. Further, according to exemplary embodiments of the present invention, the apparatus 30' (corresponding to the edge data agent (mobile edge computing component) 30) comprises a processor 115, a memory 116 and an interface 117, which are connected by a bus 118 or the like, and the apparatuses may be connected via link 119, respectively.

The processor 111/115 and/or the interface 113/117 may also include a modem or the like to facilitate communication over a (hardwire or wireless) link, respectively. The interface 113/117 may include a suitable transceiver coupled to one or more antennas or communication means for (hardwire or wireless) communications with the linked or connected device(s), respectively. The interface 113/117 is generally configured to communicate with at least one other apparatus, i.e. the interface thereof.

The memory 112/116 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the device data agent 10 comprises at least one processor 111, at least one memory 112 including computer program code, and at least one interface 113 configured for communication with at least another apparatus. The processor (i.e. the at least one processor 111, with the at least one memory 112 and the computer program code) is configured to perform receiving, from a component of said terminal, data related to an application (thus the apparatus comprising corresponding means for receiving), to perform identifying, in said data, storage data intended for cloud storage (thus the apparatus comprising corresponding means for identifying), and to perform selecting, for said storage data, a transmission path of a plurality of transmission paths to said cloud storage bypassing an application server hosting said application (thus the apparatus comprising corresponding means for selecting).

Further, according to exemplary embodiments of the present invention, an apparatus representing the edge data agent 30 comprises at least one processor 115, at least one memory 116 including computer program code, and at least one interface 117 configured for communication with at least another apparatus. The processor (i.e. the at least one processor 115, with the at least one memory 116 and the computer program code) is configured to perform receiving storage data related to an application, the storage data being originated from a terminal and intended for cloud storage (thus the apparatus comprising corresponding means for receiving), and to perform forwarding said storage data to said cloud storage bypassing an application server hosting said application (thus the apparatus comprising corresponding means for forwarding).

For further details regarding the operability/functionality of the individual apparatuses, reference is made to the above description in connection with any one of FIGS. 1 to 7, 9 and 10, respectively.

For the purpose of the present invention as described herein above, it should be noted that

- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;
- an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for optimizations for cloud storage related data flow. Such measures exemplarily comprise receiving, from a component of said terminal, data related to an application, identifying, in said data, storage data intended for cloud storage, and selecting, for said storage data, a transmission path of a plurality of transmission paths to said cloud storage bypassing an application server hosting said application.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
4G 4th Generation
5G 5th Generation
AEP application enablement platform
API application programming interface
AS application server
D2D device-to-device eNB evolved Node B, eNodeB
EPC evolved packet core
GPRS General Packet Radio Service
IoT Internet-of-Things
LTE Long Term Evolution
MEC mobile edge computing
MME mobility management entity
MTC machine type communication
ProSe Proximity Services
SCEF service capability exposure function
SDL shared data layer
SGSN serving GPRS support node
UE user equipment

The invention claimed is:

1. A method at a terminal, comprising
receiving, from a component of said terminal, data related to an application,
identifying, in said data, storage data intended for cloud storage, and
selecting, for said storage data, a transmission path of a plurality of transmission paths to said cloud storage, wherein said each of said plurality of transmission paths to said cloud storage bypasses an application server hosting said application.

2. The method according to claim 1, further comprising
transmitting, based on said selecting, said storage data to a mobile edge computing component of a mobile communication network to which said terminal is connected to, for forwarding said storage data to said cloud storage.

3. The method according to claim 2, further comprising
adding, to said storage data, control information for said mobile edge computing component including at least one of a life time scope of said storage data and an aggregation capability of said storage data.

4. The method according to claim 1, further comprising
transmitting, based on said selecting, said storage data to a core network of a mobile communication network to which said terminal is connected to, for forwarding said storage data via a mobile edge computing component of said of said mobile communication network to said cloud storage.

5. The method according to claim 4, wherein
said transmitting is effected utilizing a control plane of said mobile communication network.

6. The method according to claim 1, further comprising
transmitting, based on said selecting, said storage data to said cloud storage, bypassing a mobile communication network to which said terminal is connected to.

7. The method according to claim 6, wherein
said transmission path uses at least one of a wireless local area network interface, a Bluetooth interface, and a ZigBee interface.

8. The method according to claim 1, further comprising
receiving stored data originating from said cloud storage via any of said plurality of transmission paths.

9. The method according to claim 8, further comprising
caching said received stored data.

10. The method according to claim 1, wherein
said terminal is an internet of things device.

11. An apparatus at a terminal, the apparatus comprising
at least one processor,
at least one memory including computer program code, and
at least one interface configured for communication with at least another apparatus,
the at least one processor, with the at least one memory and the computer program code, being configured to cause the apparatus to perform:
receiving, from a component of said terminal, data related to an application,
identifying, in said data, storage data intended for cloud storage, and
selecting, for said storage data, a transmission path of a plurality of transmission paths to said cloud storage, wherein each of the plurality of transmission paths to said cloud storage bypasses an application server hosting said application.

12. The apparatus according to claim 11, wherein
the at least one processor, with the at least one memory and the computer program code, is further configured to cause the apparatus to perform
transmitting, based on said selecting, said storage data to a mobile edge computing component of a mobile communication network to which said terminal is connected to, for forwarding said storage data to said cloud storage.

13. The apparatus according to claim 12, wherein
the at least one processor, with the at least one memory and the computer program code, is further configured to cause the apparatus to perform
adding, to said storage data, control information for said mobile edge computing component including at least one of a life time scope of said storage data and an aggregation capability of said storage data.

14. The apparatus according to claim 11, wherein
the at least one processor, with the at least one memory and the computer program code, is further configured to cause the apparatus to perform
transmitting, based on said selecting, said storage data to a core network of a mobile communication network to which said terminal is connected to, for forwarding said storage data via a mobile edge computing component of said of said mobile communication network to said cloud storage.

15. The apparatus according to claim 14, wherein
said transmitting is effected utilizing a control plane of said mobile communication network.

16. The apparatus according to claim 11, wherein
the at least one processor, with the at least one memory and the computer program code, is further configured to cause the apparatus to perform
transmitting, based on said selecting, said storage data to said cloud storage, bypassing a mobile communication network to which said terminal is connected to.

17. The apparatus according to claim 16, wherein
said transmission path uses at least one of a wireless local area network interface, a Bluetooth interface, and a ZigBee interface.

18. The apparatus according to claim 11, wherein
the at least one processor, with the at least one memory and the computer program code, is further configured to cause the apparatus to perform
receiving stored data originating from said cloud storage via any of said plurality of transmission paths.

19. The apparatus according to claim 18, wherein
the at least one processor, with the at least one memory and the computer program code, is further configured to cause the apparatus to perform
caching said received stored data.

20. An apparatus for at a mobile edge computing component of a mobile communication network, the apparatus comprising at least one processor,
at least one memory including computer program code, and
at least one interface configured for communication with at least another apparatus,
the at least one processor, with the at least one memory and the computer program code, being configured to cause the apparatus to perform:
receiving storage data related to an application, the storage data being originated from a terminal and intended for cloud storage, and
forwarding said storage data to said cloud storage along a selected transmission path, the selected transmission path bypassing an application server hosting said application.

* * * * *